United States Patent
Dee et al.

(10) Patent No.: US 8,936,517 B2
(45) Date of Patent: Jan. 20, 2015

(54) LIGHT-WEIGHT COATINGS HAVING ENHANCED DURABILITY

(71) Applicants: Fujikura Composite America, Inc., Vista, CA (US); Eric Jon Nicholson, Temecula, CA (US)

(72) Inventors: Alexander Tan Dee, Carlsbad, CA (US); Andres Angel Garcia, San Marcos, CA (US); Eric Jon Nicholson, Temecula, CA (US)

(*) Notice: Subject to any disclaimer, the term of this patent is extended or adjusted under 35 U.S.C. 154(b) by 71 days.

(21) Appl. No.: 13/665,230

(22) Filed: Oct. 31, 2012

(65) Prior Publication Data

US 2013/0116063 A1    May 9, 2013

Related U.S. Application Data

(60) Provisional application No. 61/553,880, filed on Oct. 31, 2011, provisional application No. 61/556,107, filed on Nov. 4, 2011.

(51) Int. Cl.
| | |
|---|---|
| *A63B 53/10* | (2006.01) |
| *C08G 18/73* | (2006.01) |
| *C08G 18/10* | (2006.01) |
| *C08G 18/62* | (2006.01) |
| *A63B 53/12* | (2006.01) |
| *C09D 175/04* | (2006.01) |
| *C08G 18/08* | (2006.01) |

(52) U.S. Cl.
CPC .............. *A63B 53/10* (2013.01); *C08G 18/73* (2013.01); *A63B 2209/00* (2013.01); *C08G 18/10* (2013.01); *C08G 18/6225* (2013.01); *A63B 53/12* (2013.01); *C09D 175/04* (2013.01); *C08G 18/0852* (2013.01)
USPC ........... 473/321; 473/318; 524/520; 524/315; 427/402

(58) Field of Classification Search
USPC ............ 473/321, 318; 524/520, 315; 427/402
See application file for complete search history.

(56) References Cited

U.S. PATENT DOCUMENTS

| | | | |
|---|---|---|---|
| 5,158,289 A * | 10/1992 | Okumoto et al. ............. 473/319 |
| 5,827,575 A * | 10/1998 | Kasari et al. .................. 427/380 |
| 5,967,906 A | 10/1999 | Horiuchi et al. |
| 6,103,387 A | 8/2000 | Yamamoto et al. |
| 6,196,936 B1 | 3/2001 | Meckel |
| 6,632,877 B2 | 10/2003 | Crast et al. |
| 6,638,577 B2 | 10/2003 | Sano et al. |
| 6,875,837 B2 | 4/2005 | Isogawa et al. |
| 7,115,050 B2 | 10/2006 | Andre et al. |
| 7,141,628 B2 | 11/2006 | Isogawa et al. |
| 7,297,750 B2 | 11/2007 | Ishino |
| 7,309,294 B2 | 12/2007 | Sasaki |
| 7,387,821 B2 | 6/2008 | Isogawa et al. |
| 7,824,739 B2 | 11/2010 | Fujisawa et al. |
| 2002/0082358 A1 | 6/2002 | Ohira et al. |
| 2003/0203766 A1 | 10/2003 | Sano et al. |
| 2004/0053707 A1 | 3/2004 | Ohira |
| 2005/0203202 A1 | 9/2005 | Weine Ramsey |
| 2005/0272522 A1 | 12/2005 | Chen et al. |
| 2005/0282654 A1 * | 12/2005 | Sasaki ........................... 473/316 |
| 2006/0287407 A1 | 12/2006 | Ohira |
| 2006/0292379 A1 * | 12/2006 | Ishihara et al. ............. 428/423.1 |
| 2007/0022624 A1 | 2/2007 | Chu Yuk Man |
| 2007/0044704 A1 | 3/2007 | Osborne et al. |
| 2007/0213143 A1 | 9/2007 | Chinn et al. |
| 2007/0213145 A1 | 9/2007 | Lutz et al. |
| 2009/0041943 A1 * | 2/2009 | Ogawa et al. .............. 427/385.5 |
| 2009/0233731 A1 | 9/2009 | Hsu et al. |
| 2009/0298608 A1 | 12/2009 | Yatsuda |
| 2009/0298624 A1 | 12/2009 | Palumbo et al. |
| 2010/0125115 A1 | 5/2010 | Wu et al. |
| 2010/0255936 A1 | 10/2010 | Comeau et al. |
| 2010/0267464 A1 * | 10/2010 | Miura et al. .................. 473/319 |

* cited by examiner

Primary Examiner — Michael Dennis
(74) Attorney, Agent, or Firm — Kolisch Hartwell, P.C.

(57) ABSTRACT

Light-weight and/or low density paint and coating formulations that yield light-weight coatings which exhibit advantageous durability and wear resistance, including golf club shafts incorporating such paint and coating formulations.

21 Claims, No Drawings

LIGHT-WEIGHT COATINGS HAVING ENHANCED DURABILITY

This application claims the benefit under 35 U.S.C. §119 (e) of U.S. Provisional Patent Application Ser. No. 61/553,880, filed Oct. 31, 2011 and entitled LOW-DENSITY COATINGS HAVING ENHANCED DURABILITY; and U.S. Provisional Patent Application Ser. No. 61/556,107, filed Nov. 4, 2011 and entitled LIGHT-WEIGHT COATINGS HAVING ENHANCED DURABILITY, each of which is hereby incorporated by reference.

TECHNICAL FIELD

The present disclosure is directed to paints and coatings suitable for applications where minimal weight is desirable. More particularly, the application is directed to paints and coatings having a low weight and/or low density while exhibiting advantageous durability and wear resistance.

BACKGROUND

Golf club designs have undergone substantial revision since the early days of the sport, when clubs having wooden shafts and heads were used to strike golf balls made of leather and feathers. Club shafts made of hickory have gradually been replaced by shafts made of steel, titanium, carbon fiber, or other even more exotic materials.

While it is the clubhead of a golf club that transfers energy to the golf ball, it is the golf club shaft that efficiently harnesses the power of a golfer's swing. Modern club shafts are finely tuned to produce the desired amount of shaft flex, shaft torque, and swing speed, and by minimizing the weight of a club shaft swing speeds may be increased. Unfortunately, achieving weight reduction by decreasing the shaft material used in the shaft itself often compromises the performance characteristics of the resulting golf club.

SUMMARY

The present disclosure is directed to light-weight and/or low density paint and coating formulations that yield light-weight coatings exhibiting advantageous durability and wear resistance. The disclosed light-weight paint and coating formulations are particularly suitable for application to golf club shafts, and such shafts and methods of fabricating the club shafts are also disclosed herein.

DETAILED DESCRIPTION

The disclosure is directed to coatings for applications where low weight and enhanced durability are advantageous. In particular, the disclosure is directed to coatings for golf club shafts that exhibit low weight and high durability.

The enhanced coating systems disclosed herein may include one or more of shaft sealants, primers, mid-coats, light-weight paints, and clear coatings. The disclosed coatings provide coverage, wear resistance, and durability while adding less weight to the article than conventional coating systems.

Although the coating systems of the disclosure may provide substantial benefits in any of a variety of applications where weight, durability, and appearance are important factors, the disclosed coating systems exhibit particular utility for golf club manufacture, particularly in manufacture of golf club shafts. Although any suitable golf club shaft material may benefit from an application of a coating of the disclosure, the disclosed coatings exhibit particular utility on steel golf club shafts and graphite golf club shafts.

The present disclosure will discuss shaft sealants, clear coatings, and light-weight paint formulations, as well as methods of preparing golf club shafts utilizing such sealants, coatings, and paint formulations.

Synthetic Resins

As used herein, a synthetic resin is any of a variety of materials that are typically viscous liquids, but which when exposed to appropriate conditions harden into plastics having varying degrees of rigidity and/or resilience. Synthetic resins, as used herein, may include epoxy resins, acrylic resins, polyurethane resins, acetal resins, melamine resins, and unsaturated polyester resins among others. Some synthetic resins may be thermoplastic, or thermosetting resins, which harden when heated to an appropriate temperature. Other synthetic resins may require the addition of an activating agent, or hardening agent, before the resin can harden. The activating agent may be a catalyst for the polymerization of a selected synthetic resin.

Acrylic resins are derived from acrylic acid, methacrylic acid, or similar compounds. In particular, acrylic resins prepared from polymethyl methacrylate are widely available. The polymerization reaction that creates the acrylic resin is typically initiated by an activating agent that is an unstable organic peroxide. The generation of radicals initiates the polymerization of the acrylic resin. Acrylic resins are typically thermoplastic resins.

Epoxy resins are thermosetting polymer plastics formed by the reaction of an epoxide-containing resin with a polyamine activating agent.

Polyurethane resins are typically produced by reacting a monomer having one or more isocyanate functional groups with a monomer having hydroxyl functional groups. The reaction product is a thermoplastic polymer containing multiple urethane linkages.

Cellulose Ester Resin

Cellulose esters are typically prepared by esterifying cellulose, a plant-derived polysaccharide, with an acid. Cellulose esters may include cellulose acetate (CA), cellulose acetate butyrate (CAB), and cellulose acetate propionate (CAP), among others. A preferred cellulose ester resin is cellulose acetate butyrate.

Organic Solvent

As used herein, an organic solvent is a solvent selected for its compatibility with the other components of the coating formulations. In particular, the organic solvent should be miscible and nonreactive with respect to the synthetic resin, the cellulose ester resin, and the organic pigment used. Typically, the organic solvent used is a low molecular weight organic compound such as an ether, ketone, or ester. Some exemplary organic solvents include butyl acetate, methyl ethyl ketone (MEK), methyl amyl ketone (MAK), ethylene glycol monobutyl ether acetate (EB acetate), among others.

Additives

Additives are materials that may be added to the coating formulations of the disclosure to improve one or more characteristics of the resulting cured coatings such as appearance, hardness, or scratch resistance. Alternatively, an additive may be added to enhance selected characteristics of the mixture during manufacture or application, such as the miscibility of mixture components, or mixture stability.

Selected additives useful in the formulations of the present disclosure may include wetting agents, or agents for increasing scratch resistance, abrasion resistance, or coating hardness.

Polyolefin waxes, including fluorinated polyolefin waxes, may be used as additives to increase scratch resistance, or improve wetting properties. Suitable polyolefin waxes may include LUBRIZOL LANCO 106 wax and LUBRIZOL LANCO 208 wax.

Silicon-based additives may be used to increase substrate wetting, and to increase surface slip and surface gloss. Suitable silicon-based additives include BYK CHEMIE 306.

Selected additives may be used to enhance the visual appearance of the resulting painted surface, such as pearl additives, or metallic additives. Pearl additives may be used to confer a pearlescent finish on the painted surface. Metallic additives may be used to confer a metallic flake finish on the painted surface.

Shaft Sealant

The shaft sealant is a coating formulation that is typically applied to the surface of an unpainted golf club shaft to seal the surface and prepare it to receive a coating of primer, paint, or clear coating. Typically, the shaft sealant includes a synthetic resin in an amount of about 87%-93%, organic solvent in an amount of about 8%-10%, and a clear base formulation in an amount of about 1%. The resin present in the shaft sealant formulation is typically activated by the addition of an appropriate activation reagent or polymerization catalyst.

Typically, the synthetic resin is an isocyanate-reactive acrylic resin, and the organic solvent is butyl acetate. An appropriate clear base for the purposes of the disclosure is CLEAR BASE PARALOID 608B (available from Rohm and Haas Company), which includes n-butyl acetate (30%-60%), 1-butanol (10%-30%), xylene (5%-10%), amorphous silica (1%-5%), ethylbenzene (0.5%-1.5%), and 2-butoxyethyl acetate (0.1%-1%). The sealant formulation is typically activated by mixing with an isocyanate-containing acrylic resin activator in a ratio of about 5:1 sealant:activator. A suitable resin activator for this purpose is a homopolymer of 1,6-hexamethylene diisocyanate (ACTIVATOR, available from MAGNA COATINGS CORP.)

Light-Weight Paint Formulations

The paint formulations of the present disclosure may exhibit a relatively light weight, when compared to conventional paints, and/or relatively lower density when compared to conventional paints. The light-weight paint formulations of the present disclosure may include a concentrated colorant in an amount of about 1%-25%; a synthetic resin in an amount of about 55%-65%; a cellulose ester resin in an amount of about 5%-20%; and an organic solvent in an amount of about 0%-10%. Typically, the light-weight paint formulations of the disclosure include a synthetic resin that is a polyurethane resin, a cellulose ester resin that is cellulose acetate butyrate, and an organic solvent that is butyl acetate.

Without wishing to be bound by theory, it is through the addition of lighter-weight cellulose ester resins that the advantageous properties of the paints of the disclosure are obtained. The light-weight paint formulations disclosed herein may be about 8%-10% lighter than those made with a typical acrylic resin. The light-weight paint formulations may in turn be less viscous, and lend themselves to the application of thinner coats of paint than may be achieved using more conventional paint formulations. Overall, when dry, the light-weight paint formulations of the present disclosure may be about 54% and about 75% lighter for black and clear formulations, respectively, when compared to conventional paint formulations. This corresponds to an overall weight reduction of 0.38 g and 0.60 g per golf club shaft for the black and clear formulations, respectively, when comparing the light-weight formulations to their conventional paint counterparts.

In addition, the organic solvent used in the disclosed light-weight formulations typically evaporates during the baking process used to cure the applied paints, resulting in additional weight loss. For example, for selected embodiments of the disclosed light-weight paint formulations, the percentage of weight reduction through solvent loss may be about 54-67%, compared with only about 47% for selected conventional paints. This can correspond to a weight savings of about 0.05 g to about 0.12 g per golf club shaft.

One of the principle variables affecting shot distance in golf is swing speed, and the lighter the total weight of a golf club, the higher the swing speed the golfer may be able generate with that club. Although there are many factors affecting the accuracy and swing characteristics of a golf club, the use of the low-weight and/or low density coatings of the present invention may offer a significant weight savings without sacrificing appearance or coating wear characteristics, with the result being highly advantageous golf clubs.

Colorant

The colorant is any substance, such as a dye or pigment, that is compatible with the other components of the desired paint formulation and that confers a desired color and color intensity to the formulation. In particular, the colorant should be sufficiently concentrated and/or possess a sufficiently high absorbance that a satisfactorily light-weight paint formulation can be prepared using the colorant. Typically the colorant used to prepare the light-weight paint formulation is an organic pigment.

Organic pigments are materials well known in the art, and a wide variety of such pigments are commercially available for preparing light-weight paint formulations. Typically, the organic pigment is an organic or organometallic compound that is highly colored, and that can be added to a liquid or semi-liquid composition to confer a desired color. The pigment may be soluble in the composition, insoluble in the composition, or somewhat soluble in the composition.

Organic pigments are typically grouped according to the structure of the chromophore responsible for the intense color of the pigment. Such groups include azo pigments (such as toluidine red, toluidine maroon, Hansa yellow, benzidine yellow, pyrazolone red, lithol red, helio bordeaux, pigment scarlet and permanent red 2B), condensed azo-based pigments, derivatives of vat dyes (such as alizarine, indanthrone and thioindigo maroon), phthalocyanine pigments (such as phthalocyanine blue and phthalocyanine green), quinacridone pigments (such as quinacridone red and quinacridone magenta), anthraquinone pigments, dioxagine pigments, pyranthrone-based organic pigments (such as pyranthrone red and pyranthrone orange), indigo pigments, thioindigo pigments, perynone pigments, perylene pigments (such as perylene red and perylene scarlet), benzimidazolone-based organic pigments, isoindolinone-based pigments (such as isoindolinone yellow and isoindolinone orange), quinophthalone-based pigments (such as quinophthalone yellow and isoindolene pigments), flavanthrone yellow, acylamide yellow, nickel azo yellow, copper azo methine yellow, perinone orange, anthrone orange, dianthraquinonyl red, and dioxazine violet, among others.

Selected commercially available pigments may be particularly useful in preparing the light-weight coatings of the present disclosure, such as XIRALLIC T60-23 SW GALAXY BLUE, Red G dye, ORASOL Red 3GL dye, SPARTACRYL PM 60403, and SPARTACRYL PM 60407, among others.

Clear Coating

In one embodiment of the invention, the clear coating formulations of the present disclosure include a synthetic resin in an amount of about 85%-90%, an organic solvent in an amount of about 4%-7%; and a fluorinated polyolefin surface additive in an amount of about 0.1%-0.3%.

The synthetic resin is typically an acrylic resin, more typically an isocyanate-activated acrylic resin. The organic solvent is typically butyl acetate.

Without wishing to be bound by theory, it is believed that the addition of the fluorinated polyolefin surface additive to the clear coating formulation results in an enhanced quality of toughness and durability upon curing that enables the coated article to resist scratches and abrasion substantially more effectively than an article treated with a clear coating that does not include the fluorinated polyolefin surface additive.

Additionally, one or more of a non-fluorinated polyolefin surface additive and a polysiloxane surface additive may confer additional advantages, such as further enhancing the durability and scratch resistance of the resulting coating.

Although a variety of fluorinated and perfluorinated additives may confer the desired durability to the clear coating of the disclosure, a particularly suitable surface additive is LANCO TF 1778 micronized wax (Lubrizol Corporation), a fluorinated polyolefin. Lanco 208 polyolefin additive and BYK 306 polysiloxane additive are also particularly preferred additives.

The physical properties of the clear coating may be altered and/or improved by the addition of one or more surface additives, as discussed above.

For example, one embodiment of the clear coating of the disclosure includes an isocyanate-reactive acrylic resin in an amount of about 85%-90%, a polysiloxane surface additive in an amount of about 2%-3%, an organic solvent in an amount of about 5%-6%, a fluorinated polyolefin surface additive in an amount of about 0.1%, and a polyolefin wax additive in an amount of about 0.1%. The clear coating may be further modified by the addition of one or more additives to increase pot life, as is known in the art.

Typically, the clear coating formulation is activated by combining the formulation with an isocyanate-containing acrylic resin activator in a ratio of about 4:1 formulation:activator. The selected activator is typically a homopolymer of 1,6-hexamethylene diisocyanate.

Application

Where the coating is being applied to a golf club shaft, and the entire shaft is to be coated, a preferred method of application is pulling the shaft through a squeegee diaphragm in a paint reservoir ("squeegee paint pull"). However, the coatings and paints of the disclosure may be applied to the desired article of manufacture using any of a variety of methods known in the art. Such methods include spraying, silkscreening, pad printing, dipping, etc.

The applied coating must necessarily be cured to ensure that the coating is permanent and durable. Coats of light-weight paint of the disclosure can be cured, for example, for 45 minutes at 200 degrees F., while clear coatings may be cured for 60 minutes at 200 degrees F. Alternatively, either type of coating may be cured for 60 minutes at 250 degrees F. It should be understood that a variety of combinations of temperature and cure times may be used without departing from the ambit of the present invention.

In one embodiment of the invention, the light-weight coatings of the present disclosure may be applied to a mylar film, which may then be applied to the desired article using heat and pressure, creating a light-weight decal.

EXAMPLES

Example 1

Shaft Sealant

An exemplary shaft sealant formulation is prepared by mixing 3700 grams of an isocyanate-reactive acrylic resin with 360 grams butyl acetate and 40 grams CLEAR BASE PARALOID 608b (Rohm and Haas Company). The resulting mixture is activated by combining with a homopolymer of 1,6-hexamethylene diisocyanate (MAGNA hardener) at a ratio of 5:1 sealant:activator prior to application Example 2

Clear Coat (Mid Clear Coat)

An exemplary clear coating suitable for use as an intermediate coating is prepared by mixing 400 grams Isocyanate Reactive Acrylic Resin (#470C0276; MAGNA COATINGS CORP., Vista, Calif.) and 20 grams butyl acetate. The resulting mixture is combined with a homopolymer of 1,6-hexamethylene diisocyanate at a ratio of 5:1 paint:activator prior to application.

Example 3

Gloss Clear Coat

An exemplary clear surface coating is prepared by mixing 3372 grams Isocyanate Reactive Acrylic Resin (#470C0280; MAGNA COATINGS CORP., Vista, Calif.), 202 grams silicone surface additive (BYK 306, BYK Additives & Instruments), 67 grams methyl amyl ketone, 67 grams methyl ethyl ketone, 67 grams EB acetate (ethylene glycol monobutyl ether acetate), 3 grams slip additive LANCO TF 1778 (Lubrizol Corp.), 2 grams slip additive LANCO 208 (Lubrizol Corp.), and 16 grams pot life enhancer. The resulting mixture is combined with an acrylic resin activator that is a homopolymer of 1,6-hexamethylene diisocyanate at a ratio of 4:1 paint:activator prior to application Example 4

Blue Pearlescent Paint

A light-weight blue paint coating with a pearlescent finish is prepared by mixing 2792 grams of Isocyanate Reactive Acrylic Resin (#470C0276; MAGNA COATINGS CORP., Vista, Calif.) with 931 grams of cellulose acetate butyrate resin (#CA250; Color Designs International, LLC, Murrieta, Calif.) and 74 grams XIRALLIC® T60-23 SW Galaxy Blue pigment (EMD CHEMICALS).

Example 5

Red Pearlescent Paint

A light-weight red paint coating with a pearlescent finish is prepared by mixing 567 grams of Isocyanate Reactive Acrylic Resin (#470C0276; MAGNA COATINGS CORP., Vista, Calif.) with 63 grams of cellulose acetate butyrate resin (#CA250; MAGNA COATINGS CORP., Vista, Calif.), 119 grams Red G Dye, 119 grams Red 3GL Dye, and IRIODIN® 4504 Lava Red pigment (MERCK Chemicals).

Example 6

Black Paint

A light-weight black paint coating is prepared by mixing 2380 grams of Isocyanate Reactive Acrylic Resin (#470C0280; MAGNA COATINGS CORP., Vista, Calif.) with 264 grams of cellulose acetate butyrate resin (#CA250; Color Designs International, LLC, Murrieta, Calif.), 1058 grams SPARTACRYL PM® 60403 black pigment (Plasticolors, Inc.), 132 grams SPARTACRYL PM® 60407 carbazole violet pigment (Plasticolors, Inc.) and 66 grams EB acetate (ethylene glycol monobutyl ether acetate).

Example 7

Black Paint

An alternative light-weight paint coating is prepared by mixing 2655 grams of Isocyanate Reactive Acrylic Resin (#470C0276; MAGNA COATINGS CORP., Vista, Calif.) with 443 grams of cellulose acetate butyrate resin (#CA250; Magna Coatings Corp.), 443 grams of cellulose acetate butyrate resin (#CA202; Magna Coatings Corp.), 18 grams BIFLAIR 88 liquid white pearl additive (EMD Chemicals), 89 grams matting agent ACEMATT OK 412 (Evonik Industries), 89 grams Black CN Dye, and 71 grams Black Mica pigment (IRIODIN 600, EMD Chemicals).

Example 8

Steel Club Shaft Manufacture

A steel golf club shaft is sanded using a Maroon Scotch-Brite pad (3M Part #7447) or Surface Conditioning BF "A" medium sanding belt (3M Part #SC-BF). A roughness of 400 grit is preferable for scratching or abrading the surface of the chromed shaft. Care is taken to avoid removing the chrome finish. The sanded shaft is cleaned with acetone.

A coat of clear sealant as described in Example 1 is applied after mixing with MAGNA hardener (cat. no. 1900001) using a Fujikura Rubber Black 0.187 diameter squeegee. The sealant is flash-dried for 10 minutes, and then baked for 45 minutes at 200 degrees F.

The cured sealant coating is sanded with a Grey Scotch-Brite pad (3M Part #7448) or sanding belt. A roughness of 800 grit is preferable for sanding the sealer coating. After sanding the shaft has a uniform dull appearance. Any shiny spots indicate a potential adhesion problem. Any shiny spots larger than ¼" would indicate that a second coat of sealant should be applied.

The desired light-weight paint formulation is mixed 5 to 1 with MAGNA hardener and applied using a Kraft Beige 0.171 diameter squeegee. The paint is flash dried for 10 minutes, then cured by baking 45 minutes at 200 degrees F.

The paint coating is sanded using Grey Scotch-Brite pad (3M Part #7448) or sanding belt, preferably having a roughness of 800 grit.

At this point a desired decal may be applied to the painted surface. Alternatively, laser etching may be used to remove paint from the shaft in a desired pattern.

A clear coating according to Example 3 is mixed 4 to 1 with Magna hardener and applied using a Kraft green 0.171 diameter squeegee. The clear coating is flash dried for 10 minutes, and then cured by baking 60 minutes at 200 degrees F.

Example 9

Durability Testing

Steel golf club shafts are painted with a variety of light-weight coatings according to the present disclosure, a clear coat according to the present disclosure, and a rolling decal. The golf club shaft finishes are evaluated visually, and then tested for durability using an Abrasion/Rub test; an Adhesion/Cross-Hatch test; and a Chemical/Solvent test. The results of the testing are tabulated below:

| Exemplary Light-Weight Finish | Taber Abraser Test Results | Cross-Hatch Test Results | Peel Test Result |
|---|---|---|---|
| Black Mica Gloss/Clear Coat | 1,000 fail | pass | pass |
| Jet Carbon Black Matte/Clear Coat | 1,000 pass | pass | pass |
| Jet Carbon Black Soft Feel/Clear Coat - no. 2 | 1,000 pass | pass | pass |
| UNLV Red #1 Gloss/Clear Coat | 600 fail | pass | pass |
| Sapphire Prime Pink Gloss/Clear Coat | 1,000 fail | pass | pass |
| Jet Carbon Matte Ice | 1,000 pass | pass | pass |
| Diamana Red A | 1,000 pass | pass | pass |

Example 10

Durability Testing

Selected graphite golf club shafts are painted with a variety of light-weight coatings according to the present disclosure, a clear coat according to the present disclosure, and a rolling decal. The golf club shaft finishes are evaluated visually, and then tested for durability using a Chemical Wipe test, an Abrasion/Rub test; and/or an Adhesion test. The results of the testing are tabulated below:

| Light-weight Finish | Test Type | Test Result |
|---|---|---|
| Matte clear coating | Chemical Wipe | Pass |
| Gloss clear coating | Chemical Wipe | Pass |
| unsand-seal-clear coating | Chemical Wipe | Pass |
| sand-seal-clear coating | Chemical Wipe | Pass |
| Seal-gloss clear coating | Chemical Wipe | Pass |
| Graphite primer - gloss clear coating | Chemical Wipe | Pass |
| Seal - Purple - matte clear coating | Chemical Wipe | Pass |
| Matte clear coating | Shaft Paint Rub 400 | Pass |
| Gloss clear coating | Shaft Paint Rub 400 | Pass |
| unsand-seal-clear coating | Shaft Paint Rub 400 | Fail |
| sand-seal-clear coating | Shaft Paint Rub 400 | Fail |
| Seal-gloss clear coating | Shaft Paint Rub 400 | Pass |
| Graphite prime - gloss clear | Shaft Paint Rub 400 | Pass |
| Seal - purple - matte clear | Shaft Paint Rub 400 | Pass |
| Matte clear coating | Tape Pull 250 | Pass |
| Gloss clear coating | Tape Pull 250 | Pass |
| unsand-seal-clear coating | Tape Pull 250 | Pass |
| sand-seal-clear coating | Tape Pull 250 | Pass |
| Seal-gloss clear coating | Tape Pull 250 | Pass |
| graphiteprime-gloss clear coating | Tape Pull 250 | Pass |
| Seal-lsupurple-matte clear coating | Tape Pull 250 | Pass |
| Matte clear coating | X Cut Tape | Pass |
| Gloss clear coating | X Cut Tape | Pass |
| unsand-seal-clear coating | X Cut Tape | Pass |
| sand-seal-clear coating | X Cut Tape | Pass |
| Seal-gloss clear coating | X Cut Tape | Pass |

-continued

| Light-weight Finish | Test Type | Test Result |
|---|---|---|
| graphiteprime-gloss clear coating | X Cut Tape | Pass |
| Seal-lsupurple-matte clear coating | X Cut Tape | Pass |

Example 11

Abrasion Resistance Testing

A 37" steel golf club shaft and a 41" graphite golf club shaft were each painted with light-weight coatings according to the present disclosure, specifically a primer coating, a light-weight paint base coating, and a clear coating. Each shaft was tested for abrasion resistance using a Falling Sand Abrasion Tester dispensing at least 12 liters of Silicon Carbide #16 abrasive. Both the painted steel shaft and the painted graphite shaft passed the abrasion test.

Example 12

Ball Drop Testing

A steel golf club shaft was painted with light-weight coatings according to the present disclosure, and subjected to a ball bearing drop test. The finish was not damaged by the impact of a 4 kg ball bearing.

Example 13

Weight Measurements

A series of graphite golf club shafts were treated with a base coat of a light-weight paint, a mid clear coating, and a final clear coating.

Shaft nos. 1-5 were treated with a Blur Blue light-weight paint formulation mixed with activator at a 6 to 1 ratio; a mid clear coating as disclosed herein (see Example 2) mixed with activator at a 4 to 1 ratio, and a clear coating as disclosed herein (see Example 1).

Shaft nos. 6-10 were treated with a conventional paint formulation (PPG Blur Blue Pearl 515328) mixed with activator at a 5 to 1 ratio, a conventional mid clear coat (Prolink 427S000NB37A-2) mixed with activator at a 5 to 1 ratio, and the same conventional clear coat formulation as a final clear coat (Prolink 427S000NB37A-2) mixed with activator at a 5 to 1 ratio.

Shaft nos. 11-15 were treated with a Blur Blue light-weight paint formulation according to the present invention mixed with activator at a 6 to 1 ratio; a mid clear coating according to the present invention mixed with activator at a 6 to 1 ratio, and a conventional clear coating (PPG 1 k clear gloss Heat Activated).

The results are tabulated below:

TABLE 1

Application of Base Coat

| Shaft No. | Mid Inspection Shaft Tip OD @ 1" (in) | Wt at Mid Inspection (g) | Weight After Paint (Dry) (g) | Final Shaft Tip OD @ 1" (in) |
|---|---|---|---|---|
| 1 | 0.35126 | 60.2 | 60.5 | 0.3514 |
| 2 | 0.35112 | 60.5 | 60.9 | 0.35161 |
| 3 | 0.35044 | 59.8 | 60.3 | 0.35144 |
| 4 | 0.35192 | 60.6 | 61 | 0.35225 |
| 5 | 0.35065 | 60.6 | 61.1 | 0.35212 |
| 6 | 0.35119 | 50.7 | 51.8 | 0.35278 |
| 7 | 0.35052 | 56.8 | 57.8 | 0.35204 |
| 8 | 0.35119 | 56.9 | 57.9 | 0.35223 |
| 9 | 0.35099 | 50.8 | 51.8 | 0.35238 |
| 10 | 0.35079 | 53.6 | 54.5 | 0.35175 |
| 11 | 0.3513 | 52 | 52.5 | 0.3518 |
| 12 | 0.35138 | 52.5 | 52.9 | 0.35219 |
| 13 | 0.35126 | 52.5 | 53 | 0.35189 |
| 14 | 0.35156 | 52.2 | 52.7 | 0.35163 |
| 15 | 0.35102 | 52.2 | 52.7 | 0.35176 |

TABLE 2

Application of Clear Coat

| Shaft No. | Shaft Buff or No Buff? | Wt After Mid Clear (Dry)(g) | Tip OD @ 1" after Mid Clear (in) | Final Shaft Tip OD @ 1" (in) | Weight After Clear (Dry) (g) |
|---|---|---|---|---|---|
| 1 | Yes | 60.6 | 0.35186 | 0.35241 | 61.2 |
| 2 | Yes | 61.2 | 0.35213 | 0.35256 | 61.8 |
| 3 | Yes | 60.5 | 0.35201 | 0.3522 | 61.1 |
| 4 | Yes | 61.3 | 0.35257 | 0.35292 | 61.8 |
| 5 | Yes | 61.2 | 0.35263 | 0.353 | 61.8 |
| 6 | Yes | 52.9 | 0.35463 | 0.3566 | 54.3 |
| 7 | Yes | 58.9 | 0.35367 | 0.3556 | 60.1 |
| 8 | Yes | 58.9 | 0.35387 | 0.35619 | 60.2 |
| 9 | Yes | 52.9 | 0.35388 | 0.35561 | 54.2 |
| 10 | Yes | 55.6 | 0.35373 | 0.35516 | 56.9 |
| 11 | Yes | 52.9 | 0.35246 | 0.35417 | 54 |
| 12 | Yes | 53.2 | 0.35309 | 0.35465 | 54.5 |
| 13 | Yes | 53.2 | 0.35254 | 0.35449 | 54.7 |
| 14 | Yes | 53.3 | 0.35236 | 0.354 | 54.3 |
| 15 | Yes | 53.5 | 0.35217 | 0.35341 | 54.1 |

TABLE 3

Results

| Shaft No. | Base Coat Results | | Mid Clear Coat Results | | Final Clear Coat Results |
| | Finished Base Coat Thickness @ Tip (in) | Base Coat Weight Dry (g) | Finished Base Coat Thickness @ Tip (in) | Mid Clear Weight Dry (g) | Final Clear Weight Dry (g) |
|---|---|---|---|---|---|
| 1 | 0.000070 | 0.3 | 0.00023 | 0.1 | 0.6 |
| 2 | 0.000245 | 0.4 | 0.00026 | 0.3 | 0.6 |
| 3 | 0.0005 | 0.5 | 0.000285 | 0.2 | 0.6 |
| 4 | 0.000165 | 0.4 | 0.00016 | 0.3 | 0.5 |
| 5 | 0.000735 | 0.5 | 0.000255 | 0.1 | 0.6 |
| Average | | 0.42 | | 0.2 | 0.58 |
| 6 | 0.000795 | 1.1 | 0.000925 | 1.1 | 1.4 |
| 7 | 0.00076 | 1 | 0.000815 | 1.1 | 1.2 |
| 8 | 0.00052 | 1 | 0.00082 | 1 | 1.3 |
| 9 | 0.000695 | 1 | 0.00075 | 1.1 | 1.3 |
| 10 | 0.00048 | 0.9 | 0.00099 | 1.1 | 1.3 |
| Average | | 1.0 | | 1.08 | 1.3 |
| 11 | 0.00025 | 0.5 | 0.00033 | 0.4 | 1.1 |
| 12 | 0.000405 | 0.4 | 0.00045 | 0.3 | 1.3 |
| 13 | 0.000315 | 0.5 | 0.000325 | 0.2 | 1.5 |
| 14 | 3.5E−05 | 0.5 | 0.000365 | 0.6 | 1 |
| 15 | 0.00037 | 0.5 | 0.000205 | 0.8 | 0.6 |
| Average | | 0.48 | | 0.46 | 1.1 |

TABLE 4

| Shaft No. | TOTAL Weight Applied (g) | Cross Hatch Test >4B | Rub Test >400 |
|---|---|---|---|
| 1 | 1.00 | | |
| 2 | 1.30 | | |
| 3 | 1.30 | | |
| 4 | 1.20 | | |
| 5 | 1.20 | | |
| | 1.2 | Pass | Fail |
| 6 | 3.60 | | |
| 7 | 3.30 | | |
| 8 | 3.30 | | |
| 9 | 3.40 | | |
| 10 | 3.30 | | |
| | 3.38 | Pass | Pass |
| 11 | 2.00 | | |
| 12 | 2.00 | | |
| 13 | 2.20 | | |
| 14 | 2.10 | | |
| 15 | 1.90 | | |
| Average | 2.04 | Pass | Pass |

As shown above, the light-weight coatings (Shaft nos. 1-5 and 11-15) add significantly less weight to the resulting golf club shaft than the conventional paint formulations (Shaft nos. 6-10).

Example 14

Weight Measurements of Light-Weight Coatings

A series of graphite golf club shafts were treated with various coating formulations.

Shaft nos. 1-5 were treated with a light-weight paint formulation (CDI Blur Blue LD) mixed with activator at a 6 to 1 ratio; a light-weight mid clear coating (CDI 470C51C006 LD mid clear) mixed with activator at a 6 to 1 ratio, and a light-weight clear coating (CDI470C51C007 LD Top Clear #2).

Shaft nos. 6-10 were treated with a light-weight paint formulation (PPG LD Blur Blue Pearl Revised) mixed with activator at a 5 to 1 ratio, a conventional mid clear coat (PPG ext. 52110-1 LD Mid Clear) mixed with activator at a 5 to 1 ratio, and the same conventional clear coat formulation as a final clear coat (Prolink 427S000NB37A-2) mixed with activator at a 5 to 1 ratio.

Shaft nos. 11-15 were treated with a light-weight paint formulation according to the present invention (PPG LD Blur Blue Pearl Revised) mixed with activator at a 6 to 1 ratio; a light-weight mid clear coating (PPG ext. 52110-1 LD Mid Clear) mixed with activator at a 6 to 1 ratio, and a conventional clear coating (Prolink 427S000NB37A-2).

The results are tabulated below:

TABLE 5

Application of Base Coat

| Shaft No. | Wt at Mid Inspection (g) | Weight After Paint (Dry) (g) |
|---|---|---|
| 1 | 59.4 | 59.9 |
| 2 | 59.2 | 59.7 |
| 3 | 59.4 | 59.8 |
| 4 | 59.4 | 59.8 |
| 5 | 59.4 | 59.8 |
| 6 | 59.3 | 59.7 |
| 7 | 59 | 59.8 |
| 8 | 59.4 | 59.9 |
| 9 | 59.4 | 60 |
| 10 | 59.4 | 59.7 |
| 11 | 59.3 | 59.7 |
| 12 | 59.3 | 59.5 |
| 13 | 59.4 | 59.9 |
| 14 | 59.4 | 59.9 |
| 15 | 59.3 | 59.8 |

TABLE 6

Application of Clear Coat

| Shaft No. | Shaft Buff or No Buff? | Wt After Mid Clear (Dry)(g) | Weight After Clear (Dry) (g) |
|---|---|---|---|
| 1 | Yes | 60.1 | 60.6 |
| 2 | Yes | 59.9 | 60.5 |
| 3 | Yes | 60.1 | 60.7 |
| 4 | Yes | 60 | 60.7 |
| 5 | Yes | 60 | 60.7 |
| 6 | Yes | 60.1 | 61.2 |
| 7 | Yes | 60.1 | 61.4 |
| 8 | Yes | 60.3 | 61.6 |
| 9 | Yes | 60.3 | 61.7 |
| 10 | Yes | 60.1 | 61.5 |
| 11 | Yes | 60 | 61.5 |
| 12 | Yes | 59.8 | 61.3 |
| 13 | Yes | 60.3 | 61.7 |
| 14 | Yes | 60.3 | 61.7 |
| 15 | Yes | 60.3 | 61.7 |

TABLE 7

Results

| Shaft No. | Base Coat Results | | Mid Clear Coat Results | | Final Clear Coat Results |
|---|---|---|---|---|---|
| | Finished Base Coat Thickness @ Tip (in) | Base Coat Weight Dry (g) | Finished Base Coat Thickness @ Tip (in) | Mid Clear Weight Dry (g) | Final Clear Weight Dry (g) |
| 1 | 0 | 0.5 | 0 | 0.2 | 0.5 |
| 2 | 0 | 0.5 | 0 | 0.2 | 0.6 |
| 3 | 0 | 0.4 | 0 | 0.3 | 0.6 |
| 4 | 0 | 0.4 | 0 | 0.2 | 0.7 |
| 5 | 0 | 0.4 | 0 | 0.2 | 0.7 |
| Average | | 0.44 | | 0.22 | 0.62 |
| 6 | 0 | 0.4 | 0 | 0.4 | 1.1 |
| 7 | 0 | 0.8 | 0 | 0.3 | 1.3 |
| 8 | 0 | 0.5 | 0 | 0.4 | 1.3 |
| 9 | 0 | 0.6 | 0 | 0.3 | 1.4 |
| 10 | 0 | 0.3 | 0 | 0.4 | 1.4 |
| Average | | 0.5 | | 0.36 | 1.3 |
| 11 | 0 | 0.4 | 0 | 0.3 | 1.5 |
| 12 | 0 | 0.2 | 0 | 0.3 | 1.5 |
| 13 | 0 | 0.5 | 0 | 0.4 | 1.4 |
| 14 | 0 | 0.5 | 0 | 0.4 | 1.4 |
| 15 | 0 | 0.5 | 0 | 0.5 | 1.4 |
| Average | | 0.42 | | 0.38 | 1.44 |

TABLE 8

| | Durability | | |
|---|---|---|---|
| Shaft No. | TOTAL Weight Applied (g) | Cross Hatch Test >4B | Rub Test >400 |
| 1 | 1.20 | | |
| 2 | 1.30 | | |
| 3 | 1.30 | | |
| 4 | 1.30 | | |
| 5 | 1.30 | | |
| | 1.28 | Pass | Fail |
| 6 | 1.90 | | |
| 7 | 2.40 | | |
| 8 | 2.20 | | |
| 9 | 2.30 | | |
| 10 | 2.10 | | |
| | 2.18 | Pass | Pass |
| 11 | 2.20 | | |
| 12 | 2.00 | | |
| 13 | 2.30 | | |
| 14 | 2.30 | | |
| 15 | 2.40 | | |
| Average | 2.24 | Pass | Pass |

Example 15

Weight Measurements of Conventional Coatings

A series of graphite golf club shafts were treated with various conventional coating formulations.

Shaft nos. 1-2 were treated with a Jet Carbon Black #1 and a Gloss Gloss Clear Coat 708R51C008.

Shaft nos. 3-4 were treated with a Jet Carbon Black #2 and a Gloss Gloss Clear Coat 708R51C008.

Shaft nos. 5-7 were treated with a Jet Carbon Black #3 and a Gloss Gloss Clear Coat 708R51C008.

Shaft nos. 8-10 were treated with a Jet Carbon Black #4 and a Gloss Gloss Clear Coat 708R51C008.

TABLE 9

| | Application of Base Coat | |
|---|---|---|
| Shaft No. | Wt at Mid Inspection (g) | Weight After Paint (Dry) (g) |
| 1 | 68.1 | 68.7 |
| 2 | 73.2 | 73.8 |
| 3 | 60.6 | 61.1 |
| 4 | 62 | 62.5 |
| 5 | 79.8 | 80.6 |
| 6 | 79.9 | 80.7 |
| 7 | 77.2 | 78.1 |
| 8 | 44.7 | 45.1 |
| 9 | 44.9 | 45.3 |
| 10 | 44.9 | 45.3 |

TABLE 10

| | Application of Clear Coat | |
|---|---|---|
| Shaft No. | Visual Buff Results | Weight After Clear (Dry) (g) |
| 1 | Pass | 69.4 |
| 2 | Pass | 74.4 |
| 3 | Pass | 61.8 |
| 4 | Pass | 63.2 |
| 5 | Pass | 81.2 |
| 6 | Pass | 81.5 |
| 7 | Pass | 78.8 |
| 8 | Fail | 45.9 |
| 9 | Fail | 46 |
| 10 | Fail | 46 |

TABLE 11

| | Results | |
|---|---|---|
| Shaft No. | Base Coat Results Base Coat Weight Dry (g) | Final Clear Coat Results Final Clear Weight Dry (g) |
| 1 | 0.6 | 0.7 |
| 2 | 0.6 | 0.6 |
| Average | 0.6 | 0.65 |
| 3 | 0.5 | 0.7 |
| 4 | 0.5 | 0.7 |
| Average | 0.5 | 0.7 |
| 5 | 0.8 | 0.6 |
| 6 | 0.8 | 0.8 |
| 7 | 0.9 | 0.7 |
| Average | 0.8 | 0.7 |
| 8 | 0.8 | 0.8 |
| 9 | 0.7 | 0.7 |
| 10 | 0.7 | 0.7 |
| Average | 0.7 | 0.7 |

TABLE 12

| | Durability | | |
|---|---|---|---|
| Shaft No. | TOTAL Weight Applied (g) | Cross Hatch Test >4B | Rub Test >400 |
| 1 | 1.30 | | |
| 2 | 1.20 | | |
| Average | 1.25 | Pass | Pass |
| 3 | 1.20 | | |
| 4 | 1.20 | | |
| Average | 1.20 | Pass | Pass |
| 5 | 1.40. | | |
| 6 | 1.60 | | |
| 7 | 1.60 | | |
| Average | 1.53 | Pass | Pass |
| 8 | 1.20 | | |
| 9 | 1.10 | | |
| 10 | 1.10 | | |
| Average | 1.10 | Pass | Pass |

Example 16

Weight Measurements of Conventional Coatings

A series of graphite golf club shafts were treated with various conventional coating formulations. Shaft nos. 1-5 were treated with PPG Triple Black 519300 paint formulation and CU Matte clear 708R51C007LD.

TABLE 13

| | Application of Base Coat | | | |
|---|---|---|---|---|
| Shaft No. | Mid Inspection Shaft Tip OD @ 1" (in) | Wt at Mid Inspection (g) | Weight After Paint (Dry) (g) | Final Shaft Tip OD @ 1" (in) |
| 1 | 0.35109 | 52 | 53 | 0.35268 |
| 2 | 0.35079 | 54 | 54.9 | 0.35184 |

TABLE 13-continued

Application of Base Coat

| Shaft No. | Mid Inspection Shaft Tip OD @ 1" (in) | Wt at Mid Inspection (g) | Weight After Paint (Dry) (g) | Final Shaft Tip OD @ 1" (in) |
|---|---|---|---|---|
| 3 | 0.35119 | 56 | 57 | 0.35223 |
| 4 | 0.35099 | 52 | 52.9 | 0.35238 |
| 5 | 0.35052 | 53 | 53.8 | 0.35204 |

TABLE 14

Application of Clear Coat

| Shaft No. | Shaft Buff or No Buff? | Wt After Mid Clear (Dry)(g) | Weight After Clear (Dry) (g) |
|---|---|---|---|
| 1 | Pass | 0.35323 | 53.7 |
| 2 | Pass | 0.35227 | 55.5 |
| 3 | Pass | 0.35298 | 57.7 |
| 4 | Pass | 0.35288 | 53.5 |
| 5 | Pass | 0.35257 | 54.5 |

TABLE 15

Results

| | Base Coat Results | | Final Clear Coat Results | |
|---|---|---|---|---|
| Shaft No. | Finished Base Coat Thickness @ Tip (in) | Base Coat Weight Dry (g) | Finished Base Coat Thickness @ Tip (in) | Mid Clear Weight Dry (g) |
| 1 | 0.00159 | 1 | 0.00055 | 0.7 |
| 2 | 0.00105 | 0.9 | 0.00043 | 0.6 |
| 3 | 0.00104 | 1 | 0.00075 | 0.7 |
| 4 | 0.00139 | 0.9 | 0.0005 | 0.6 |
| 5 | 0.00152 | 0.8 | 0.00053 | 0.7 |
| Average | | 0.92 | | 0.66 |

Each golf club shaft passed both the Cross Hatch Test and Rub Test.

Example 17

Weight Measurements of Conventional Coatings

A series of graphite golf club shafts were treated with various conventional coating formulations. Shaft nos. 1-4 were treated with PPG Triple Black 519300 paint formulation and PPG Velvet Clear #5 6100050.

TABLE 16

Application of Base Coat

| Shaft No. | Mid Inspection Shaft Tip OD @ 1" (in) | Wt at Mid Inspection (g) | Weight After Paint (Dry) (g) | Final Shaft Tip OD @ 1" (in) |
|---|---|---|---|---|
| 1 | 0.37 | 55.9 | 56.8 | 0.3720 |
| 2 | 0.37 | 55.6 | 56.5 | 0.3720 |
| 3 | 0.37 | 56.1 | 57.1 | 0.3730 |
| 4 | 0.37 | 56.0 | 57.1 | 0.3730 |

TABLE 17

Application of Clear Coat

| Shaft No. | Shaft Buff or No Buff? | Wt After Mid Clear (Dry)(g) | Weight After Clear (Dry) (g) |
|---|---|---|---|
| 1 | Pass | 0.3739 | 57.6 |
| 2 | Pass | 0.3735 | 57.3 |
| 3 | Pass | 0.374 | 58 |
| 4 | Pass | 0.3742 | 57.9 |

TABLE 18

Results

| | Base Coat Results | | Final Clear Coat Results | |
|---|---|---|---|---|
| Shaft No. | Finished Base Coat Thickness @ Tip (in) | Base Coat Weight Dry (g) | Finished Base Coat Thickness @ Tip (in) | Mid Clear Weight Dry (g) |
| 1 | 0.002 | 0.9 | 0.0019 | 0.8 |
| 2 | 0.002 | 0.9 | 0.0015 | 0.8 |
| 3 | 0.003 | 1 | 0.001 | 0.9 |
| 4 | 0.003 | 1.1 | 0.0012 | 0.8 |
| Average | | 0.975 | | 0.825 |

Each golf club shaft passed both the Cross Hatch Test, but failed the Rub Test.

This disclosure describes various examples of light-weight and/or low-density coating formulations. However, many alternatives and modifications which may or may not be expressly mentioned are enabled, implied, and accordingly covered by the spirit of the disclosure and the appended claims.

The formulations may have applications for use with any type of shaft that flexes to which paint must be applied and/or to any type of product where a light-weight paint and/or low-density paint may be desired. For example, the formulations of the present disclosure may have applications for other types of golf equipment (e.g., golf club heads, including ones made of graphite or steel, golf balls, etc.) as well in many other applications. For example, the present formulations may be used on types of sports recreational equipment, such as tennis or badminton rackets, baseball bats, lacrosse sticks, bicycle frames, bows, arrows, and the like. Due to their light weight and improved durability, the present formulations may be advantageous when used in conjunction with vehicles such as cars, airplanes, spacecraft, and others.

The disclosure set forth above may encompass one or more distinct embodiments with independent utility. While each of these embodiments has been disclosed in its preferred form, the specific embodiments as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the disclosure recites "a" or "a first" element or the equivalent thereof, such disclosure should be understood to include incorporation of one or more such elements, neither requiring nor excluding two or more such elements. Novel and non-obvious combinations and subcombinations of features, functions, elements and/or properties may be claimed through presentation of claims in this or a related application.

What is claimed is:

1. A coated golf club shaft, comprising a golf club shaft coated in a clear coating; wherein the clear coating formulation comprises a synthetic resin in an amount of about 85% to about 90%; an organic solvent in an amount of about 4% to about 7%; and a fluorinated polyolefin surface additive in an amount of about 0.1% to about 0.3%; wherein the clear coating formulation is applied to the golf club shaft and cured.

2. The coated golf club shaft of claim 1, wherein the golf club shaft is a graphite golf club shaft.

3. The coated golf club shaft of claim 1, wherein a sealant formulation is applied to the golf club shaft prior to application of the clear coating formulation.

4. The coated golf club shaft of claim 3, wherein the sealant formulation comprises
   an isocyanate-reactive acrylic resin in an amount of about 87% to about 93%;
   butyl acetate in an amount of about 8% to about 10%; and
   a clear base formulation in an amount of about 1%; and
   where the sealant formulation is activated by mixing with the sealant formulation with an isocyanate-containing acrylic resin activator in a ratio of about 5:1 sealant: activator.

5. The coated golf club shaft of claim 4, wherein the club shaft is prepared by a method comprising:
   sanding a steel golf club shaft sufficiently to abrade a shaft surface;
   applying the sealant formulation to the club shaft;
   curing the applied sealant;
   sanding the sealant coating;
   applying the clear coating formulation;
   curing the clear coating.

6. The coated golf club shaft of claim 5, further comprising applying a paint coating between the sealant coating and the clear coating.

7. The coated golf club shaft of claim 6, wherein the paint coating is a light-weight paint coating.

8. A coated golf club shaft, comprising a graphite golf club shaft coated in a clear coating; wherein the clear coating formulation comprises a synthetic resin in an amount of about 85% to about 90%; an organic solvent in an amount of about 4% to about 7%; and a fluorinated polyolefin surface additive in an amount of about 0.1% to about 0.3%; a light-weight paint formulation; wherein the light-weight paint formulation is applied to the golf club shaft and cured, and the clear coating formulation is applied to the painted golf club shaft, and cured.

9. The coated golf club shaft of claim 8, wherein the light-weight paint formulation loses about 54% to about 67% of its weight during curing.

10. The coated golf club shaft of claim 8, wherein the light-weight paint includes:
    a concentrated colorant in an amount of about 1% to about 25%;
    a synthetic resin in an amount of about 55% to about 65%;
    a cellulose ester resin in an amount of about 5% to about 20%; and
    an organic solvent in an amount of about 0% to about 10%.

11. The coated golf club shaft of claim 10, wherein the light-weight paint includes a synthetic resin that is a polyurethane resin; a cellulose ester resin that is cellulose acetate butyrate; and an organic solvent that is butyl acetate.

12. The coated golf club shaft of claim 10, wherein light-weight paint further comprises about 1% to about 6% pearl paint additive.

13. The coated golf club shaft of claim 10, wherein the light-weight paint further comprises about 1% to about 5% metallic paint additive.

14. The coated golf club shaft of claim 8, wherein the concentrated colorant is an organic pigment.

15. The coated golf club shaft of claim 1, further comprising an initial light-weight primer coating.

16. The coated golf club shaft of claim 1, wherein the synthetic resin of the clear coating formulation is an acrylic resin.

17. The coated golf club shaft of claim 1, wherein the organic solvent of the clear coating formulation is butyl acetate, and the weight percent ratio of synthetic resin to butyl acetate is about 10:1.

18. The coated golf club shaft of claim 1, wherein the clear coating formulation further comprises one or more of a silicone surface additive and a polyolefin wax additive.

19. The coated golf club shaft of claim 1, wherein the clear coating formulation comprises:
    an isocyanate-reactive acrylic resin in an amount of about 85% to about 90%;
    a polysiloxane surface additive in an amount of about 2% to about 3%;
    an organic solvent in an amount of about 5% to about 6%;
    a fluorinated polyolefin surface additive in an amount of about 0.1%;
    a polyolefin wax additive in an amount of about 0.1%.

20. The coated golf club shaft of claim 1, wherein the clear coating formulation is combined with an isocyanate-containing acrylic resin activator in a ratio of about 4:1 formulation: activator.

21. The coated golf club shaft of claim 20, wherein the isocyanate-containing acrylic resin activator is a homopolymer of 1,6-hexamethylene diisocyanate.

* * * * *